US006857263B2

(12) United States Patent
Gray, Jr. et al.

(10) Patent No.: US 6,857,263 B2
(45) Date of Patent: Feb. 22, 2005

(54) LOW EMISSION DIESEL COMBUSTION SYSTEM WITH LOW CHARGE-AIR OXYGEN CONCENTRATION LEVELS AND HIGH FUEL INJECTION PRESSURES

(75) Inventors: Charles L. Gray, Jr., Pinckney, MI (US); David James Haugen, Ann Arbor, MI (US)

(73) Assignee: The United States of America as represented by the Administrator of the Environmental Protection Agency, Washington, DC (US)

( * ) Notice: Subject to any disclaimer, the term of this patent is extended or adjusted under 35 U.S.C. 154(b) by 0 days.

(21) Appl. No.: 10/666,678

(22) Filed: Sep. 19, 2003

(65) Prior Publication Data

US 2004/0055282 A1 Mar. 25, 2004

Related U.S. Application Data

(63) Continuation-in-part of application No. 10/214,229, filed on Aug. 8, 2002, now Pat. No. 6,651,432.

(51) Int. Cl.[7] .............................. F01N 3/10; F01N 5/04; F02M 25/07
(52) U.S. Cl. .............................. 60/278; 60/280; 60/285; 60/605.2; 123/698
(58) Field of Search .............................. 123/1 A, 25 E, 123/305, 435, 698, 699, 568.12, 568.16, 568.21, 559.1, 559.2, 564; 60/278–280, 285, 605.2, 602

(56) References Cited

U.S. PATENT DOCUMENTS

| | | | |
|---|---|---|---|
| 3,851,632 A | * 12/1974 | Teshirogi et al. | ............ 123/699 |
| 4,612,770 A | * 9/1986 | Tadokoro et al. | ............. 60/602 |
| 5,404,841 A | * 4/1995 | Valentine | .................. 123/25 E |
| 5,743,243 A | 4/1998 | Yanagihara | |
| 5,778,857 A | * 7/1998 | Nakamura et al. | .......... 123/435 |

(List continued on next page.)

OTHER PUBLICATIONS

Melvin Woods, et al., High Pressure Fuel Injections for High Power Density Diesel Vehicles, SAE 2000–01–1186.

Amrita R. Wadhwa, et al., An Investigation of the Dependence of NO and Soot Formation and Oxidation, SAE 2000–01–0507 in Transient Combusting Jets in Injection and Chamber Condition.

*Primary Examiner*—Willis R. Wolfe, Jr.
(74) *Attorney, Agent, or Firm*—David H. Read

(57) ABSTRACT

This invention sets forth a commercially viable diesel combustion system that meets environmentally acceptable levels of NOx emissions (i.e. 0.2 g/bhp-hr or lower across a full map of engine speeds and loads) without the need for use of NOx aftertreatments, and simultaneously maintains engine-out PM emissions relatively close (e.g. with smoke levels at or below 3 BSN) to environmentally acceptable PM post-aftertreatment levels. The invention achieves these results by operating within a unique combination of parameters. These parameters comprise: (1) charge-air oxygen concentration below 16%, preferably between 10% and 15%, more preferably between 11% and 14%, and most preferably between 12% and 13.5% for virtually all engine operating conditions (but not necessarily at no-load or low load conditions), (2) fuel injection pressures at or exceeding 1800 bar, preferably exceeding 2100 bar, more preferably exceeding 2300 bar, and most preferably exceeding 2500 bar, at most engine speeds and loads, and (3) charge-air mass/fuel mass ratio between 25:1 and 45:1 for medium and high loads. Furthermore, the system is preferably run continuously slightly lean of stoichiometry, providing just enough excess oxygen to facilitate completeness of combustion and to maintain an exhaust oxygen level sufficient for continuous trap regeneration at a balance point in operation.

55 Claims, 8 Drawing Sheets

U.S. PATENT DOCUMENTS

| | | | |
|---|---|---|---|
| 6,173,704 B1 * | 1/2001 | Komoriya et al. | 123/698 |
| 6,209,515 B1 * | 4/2001 | Gotoh et al. | 123/568.21 |
| 6,230,683 B1 * | 5/2001 | zur Loye et al. | 123/435 |
| 6,276,139 B1 | 8/2001 | Moraal | |
| 6,276,334 B1 * | 8/2001 | Flynn et al. | 123/435 |
| 6,279,550 B1 * | 8/2001 | Bryant | 123/559.1 |
| 6,286,482 B1 * | 9/2001 | Flynn et al. | 123/435 |
| 6,295,816 B1 * | 10/2001 | Gallagher et al. | 123/564 |
| 6,325,054 B1 * | 12/2001 | Wenger et al. | 60/280 |
| 6,516,774 B2 * | 2/2003 | zur Loye et al. | 123/305 |
| 6,651,432 B1 * | 11/2003 | Gray, Jr. | 60/605.2 |

* cited by examiner

LOW EMISSION DIESEL COMBUSTION SYSTEM WITH LOW CHARGE-AIR OXYGEN CONCENTRATION LEVELS AND HIGH FUEL INJECTION PRESSURES

CROSS REFERENCE TO RELATED APPLICATION

This application is a continuation-in part of U.S. patent application Ser. No. 10/214,229, filed Aug. 8, 2002, U.S. Pat. No. 6,651,432 which application, in its entirety, is incorporated herein by reference.

BACKGROUND OF THE INVENTION

1. Field of the Invention

The present invention relates to combustion control processes for reducing harmful emissions produced in conventional diesel internal combustion engines.

2. Background of the Invention

The continuing use of diesel engines in motor vehicles greatly adds to the atmospheric presence of harmful pollutants such as nitrogen oxides (NOx) and particulate matter (PM). Conventional diesel engines emit NOx and/or PM substantially in excess of acceptable environmental levels. Nevertheless, because of their fuel efficiency, diesel engines remain preferable to gasoline engines for many applications. Attempts to reduce NOx and PM emissions from diesel engines have therefore continued for many years.

For reasons that will be discussed hereafter, the prior art has never been successful in developing a robust diesel combustion system (i.e. providing commercially acceptable responsiveness and horsepower across diverse speed and load ranges) that is capable of maintaining engine-out emissions levels of both NOx and PM simultaneously below environmentally acceptable levels. For purposes of this invention, environmentally acceptable levels of diesel NOx emissions will be defined as 0.2 g/bhp-hr or lower, and environmentally acceptable levels of diesel PM emissions will be defined as a level that can effectively be reduced to 0.01 g/bhp-hr or lower through exhaust aftertreatment.

The challenge of trying to maintain diesel engine emission levels of both NOx and PM simultaneously below environmentally acceptable levels has been a long-standing unsolved environmental and industry problem that has never been overcome despite extensive, concerted efforts by government and industry worldwide.

With the problem of simultaneously satisfactory engine-out NOx and PM reductions unsolved by the prior art for diesel engines, the diesel industry has instead turned primarily to development of NOx and PM aftertreatments (i.e. post-engine, but before the exhaust gas is released to the atmosphere) to meet current and upcoming international PM and NOx environmental regulations. However, currently many in the diesel industry view such aftertreatment systems as expensive, as retaining issues of effectiveness and durability, and as creating size ("packaging") concerns. As an example, an ongoing challenge for NOx traps is maintaining NOx emissions always below desired levels on vehicles with diverse duty cycles, and the effectiveness and durability of NOx adsorbers may also be undermined by factors such as high temperatures or by sulfate adsorption and desulfization due to sulfur content in diesel fuel. As a second example, to effectively maintain PM levels within environmentally acceptable emission levels, PM filter traps depend on engine-out PM emissions not being too high. In addition, PM filter traps must be regenerated (i.e. cleaned, such as by combusting the particulate matter trapped therein), with the frequency of such renewal dependent upon the amount of engine-out PM the trap is forced to catch and retain.

Because of the above-mentioned perceived problems with the expense and performance of NOx aftertreatments in particular, it is desirable to develop an alternative, namely, a commercially acceptable diesel combustion system that can meet environmentally acceptable levels of NOx emissions (i.e. 0.2 g/bhp-hr or lower) without the need for use of NOx aftertreatments, and thereby avoid such perceived additional costs, performance, durability and packaging issues that accompany use of NOx aftertreatments.

In addition, because of the above-mentioned perceived problems with inconvenience and expense in regenerating PM traps, the frequency of which is dependent upon the amount by which engine-out PM emissions exceed environmentally acceptable levels (i.e. exceed 0.01 g/bhp-hr), it is also desirable to simultaneously at least maintain engine-out PM emissions low enough for PM traps to efficiently and cost-effectively be able to keep PM emissions within environmentally acceptable levels. For purposes of this application, and for ease of measuring, a smoke content level at or below a maximum of 3 BSN (Bosch Smoke Number) engine-out (i.e. before aftertreatment), preferably with an average smoke content level below 1.5 BSN, would be considered indicative of an acceptable PM engine-out exhaust level for PM aftertreatment to efficiently and repeatedly keep PM emissions within environmentally acceptable levels.

OBJECT OF THE INVENTION

The object of the present invention is to ameliorate the foregoing problems by providing a commercially acceptable diesel combustion system that can meet environmentally acceptable levels of NOx emissions (i.e. 0.2 g/bhp-hr or lower across a full map of engine speeds and loads) without the need for use of NOx aftertreatments, and simultaneously maintain engine-out PM emissions low enough to allow reliable and cost effective aftertreatment to environmentally acceptable levels. In doing so, the combustion system achieves a combination of simultaneously low NOx and PM emission levels believed never to have been obtained before on a commercially viable and robust diesel combustion system.

DESCRIPTION OF THE RELATED ART

Two of the many techniques that have been developed in the prior art to reduce NOx and PM emissions from diesel engines are (1) use of exhaust gas recirculation (EGR) to lower combustion temperatures and reduce NOx formation, and (2) use of high fuel injection pressures for enhanced in-cylinder mixing effects and reduction of PM formation. Despite industry awareness of emissions benefits from moderate use of each technique in diesel engines, neither technique has thus far found commercial success at anything more than moderate usage levels. For example, EGR usage to lower NOx formation in diesel engines has generally stayed at EGR/ambient air ratios lower than 25%, particularly for medium and higher load conditions. Similarly, fuel injection pressures have generally remained at or lower than 1800 bar, with top of the line fuel injector pressures reaching a maximum in the range of 2000 bar (29,080 psi) to 30,000 psi (2063 bar), depending on the metric used. The respective reasons for these limitations on increasing EGR usage and fuel injection pressures to lower NOx and PM formation will be discussed in turn.

Prior Art Limitations on Increasing EGR Rates to Reduce NOx Formation

NOx reduction in diesel engines occurs with use of EGR primarily due to localized combustion effects, i.e. on a molecular level. Specifically, the EGR acts as a diluent to reduce in-cylinder charge-air oxygen concentration levels and thereby constrain localized unit heat increases in combustion (e.g., through the increased presence of non-oxygen molecules relative to oxygen molecules in the combustion mixture, thereby moderating the kinetic rates and heat release interaction between the fuel, oxygen and diluent molecules in the combustion mixture). This localized unit heat release dampening effect from low charge-air oxygen concentration levels limits localized heat propagation, which would otherwise create pockets in combustion where localized peak combustion temperatures exceed NOx formation levels and result in the formation of NOx. Therefore, lower charge-air oxygen concentration levels assist in avoiding localized hot NOx-formation pockets in combustion, thereby resulting in overall NOx emission reductions.

The above mechanism by which EGR usage reduces NOx formation in diesel engines is debated and widely misunderstood in the prior art. While the prior art recognizes that moderate levels of EGR will reduce NOx formation in diesel engines, most industry experts wrongly attribute NOx reduction with EGR usage to bulk effects from EGR usage— namely, an increase in the overall heat capacity of the in-cylinder charge, which limits bulk temperature increases in combustion, and thereby theoretically reduces overall NOx formation. As a result of this misunderstanding of the primary NOx-reduction benefit from EGR usage for diesel engines, the prior art has not adequately developed the concept of more actively and directly controlling charge-air oxygen concentration levels as a means to reduce diesel engine NOx emissions. Instead, because of the foregoing misunderstanding, the use of EGR to lower NOx formation is typically controlled and quantified as a "percent EGR," and not by the resulting charge-air oxygen concentration levels obtained. (See, however, U.S. Pat. No. 4,727,849 to Nishida as an example of an EGR system evaluating oxygen concentration levels). This demonstrates the prevailing lack of understanding in the prior art that the more important factor for NOx formation is the oxygen concentration level of the charge-air, not the percent EGR utilized in the combustion system. See, e.g., Hideyuki Tsunemoto, et al, The Role of Oxygen in Intake and Exhaust on NO Emission, Smoke and BMEP of a Diesel Engine with EGR System, SAE Technical Paper 800030 (1980) (refuting misperceptions by showing that, for diesel engines, reduction of NOx through EGR correlates more directly with the charge-air oxygen concentration levels obtained, rather than with other factors that result from EGR usage, such as increase in heat capacity of the in-cylinder charge).

Because the use of EGR to reduce NOx formation is conventionally controlled and measured as a "percent EGR," without active control or determination of the resulting charge-air oxygen concentration levels, determining the charge-air oxygen concentrations that have been utilized in the prior art requires some guesswork. As stated previously, EGR usage in diesel engines has generally stayed at ratios lower than 25%, particularly for medium or higher load conditions. This results in oxygen concentrations generally above at least 16–17%, although the extent to which a certain EGR usage level dilutes the resulting charge-air oxygen concentration depends on the exhaust oxygen concentration level in the EGR, which can vary, depending upon engine operating factors.[1] One exception to this rule exists with respect to experimental attempts at low temperature premix combustion (i.e. not conventional diesel combustion) in conjunction with adjustments to fuel injection timing (see, e.g., U.S. Patent Application Publication 2002/0011240 to Kimura), in which case higher EGR ratios and oxygen concentration levels just below 16% may be utilized, albeit not at medium to high engine speeds or loads (see, e.g., Kimura, at FIG. 3).

[1] An EGR rate of 25% would result in charge-air oxygen concentration levels no lower than about 16–17% (assuming an exhaust oxygen concentration no lower than 1–2%, and a slightly less than 21% oxygen concentration in ambient air). See Hideyuki Tsunemoto, et al, The Role of Oxygen in Intake and Exhaust on NO Emission, Smoke and BMEP of a Diesel Engine with EGR System, SAE Technical Paper 800030, at FIGS. 3,4 (1980) (measuring oxygen concentrations in charge-air and in exhaust at various EGR levels and diesel engine operating conditions)

Regardless of misperceptions above, it nevertheless should be repeated that it has been known in the prior art that increasing EGR levels above conventional levels (which would therefore lead to lower charge-air oxygen concentration levels) could provide some additional NOx-reduction benefit. See, for example, Jason Mark and Candace Morey, Diesel Passenger Vehicles and the Environment, Union of Concerned Scientists (1999), at 13–14. However, despite this awareness, EGR usage to reduce NOx formation has been heavily limited in the prior art by what may be referred to as the NOx-PM tradeoff. Well-known and understood by those with ordinary skill in the art, the NOx-PM tradeoff refers to the fact that changes in the combustion process that decrease NOx formation (such as by increasing EGR usage) generally result in an increase in PM formation, and vice versa. See, e.g., U.S. Pat. No. 6,055,810 to Borland (showing NOx-PM tradeoff at FIGS. 2 and 3, and discussing acceptable smoke formation levels as a known constraint limiting EGR usage). The NOx-PM tradeoff has operated as an insurmountable roadblock in the prior art to the use of high levels of EGR for further NOx emission reductions in conventional diesel engines.

In part because of the NOx-PM tradeoff, various diesel combustion experts have concluded that NOx emissions and PM emissions from diesel combustion physically cannot simultaneously both be controlled (engine-out, without aftertreatment) to environmentally acceptable levels, and that EGR levels above 25% at anything other than light or no load conditions in diesel engines will necessarily result in unacceptably poor engine performance and high particulate emission levels. For example, one group of experts found that at EGR levels above 25% at relatively light loads or higher, even under purportedly optimal engine conditions, poor engine efficiency and "excessively high levels of particulate, CO, and unburned hydrocarbons" result at levels that are "intolerable for a diesel engine." Patrick F. Flynn, et al, Minimum Engine Flame Temperature Impacts on Diesel and Spark-Ignition Engine NOx Production, SAE Technical Paper 2000-01-1177, at 97–98. These experts reasoned that the benefit of EGR in reducing NOx production reaches a limit at or around 25% EGR at normal loads, attributing the poor combustion and high particulate levels that result at such EGR ratios as being from combustion temperatures having been lowered to a required "minimum flame temperature" for acceptable combustion to be maintained in diesel combustion. Thus EGR levels beyond that amount would logically reduce combustion temperatures below the minimum flame temperature, and prevent reasonable combustion in a diesel engine. Id.[2]

[2] In terms of a lowest acceptable charge-air oxygen concentration level for acceptable conventional diesel combustion, this theoretical maximum EGR rate of 25% at normal loads would result in charge-air oxygen concentration levels no lower than about 16–17% (see fn. 1 above). This presumed 16–17% minimum oxygen concentration figure for conventional diesel combustion in the prior art finds some support in various low oxygen flammability studies. These studies have found that oxygen concentrations below 16–17% significantly impede the ability for combustion to be maintained, and that hydrocarbon fuels become completely inert in environments with oxygen concentration levels lowered to around 12–13% at standard temperature and pressure. See U.S. Pat. No. 6,401,487 to Kotliar; see also Samuel V. Zinn, Inerted Fuel Tank Oxygen Concentration Requirements, FAA Report No. FAA-RD-71-42, at FIG. 6 (1971).

As a result of studies such as the Flynn report, and because of prior art failures to avoid the effects of the NOx-PM tradeoff and intolerably poor combustion in conventional diesel combustion with high EGR ratios, EGR usage has been capped in the prior art for diesel combustion systems, and high levels of EGR (and correspondingly low charge-air oxygen concentrations) have not been successfully utilized in commercial diesel engines at other than light load or no load conditions. In addition, higher levels of EGR are also seen by industry as creating exhaust gas temperature cooling requirements that would require additional costs and packaging space to utilize (because of the use of high pressure EGR loops instead of a more preferred low pressure EGR loop, which allows natural exhaust gas cooling). Because of these reasons, "[i]t is normally always an objective to minimize the total amount of EGR utilized, in order to minimize particulate emissions," as stated in U.S. Pat. No. 4,485,794 to Kimberley.

Prior Art Limitations on Increasing Fuel Injection Pressures to Lower PM Emissions It has also been known in the prior art that use of a "high" fuel injection pressure is a way to increase the mixing effect in direct-injection engines and thereby to receive some emissions-reducing benefits. For example, the following references each discuss use of "high" fuel injection pressures to reduce soot formation in diesel engines:

Godfrey Greeves, et al, Advanced Two-Actuator EUI and Emission Reduction for Heavy Duty Engines, SAE Technical Paper 2003-01-0698. This reference disclosed an increased air/fuel mixing rate and reduction in smoke formation by increasing nozzle opening fuel injection pressures from 300–325 bar to 1100 bar at certain diesel engine speeds and loads.

Gerhard Stumpp, et al, Common Rail—An Attractive Fuel Injection System for Passenger Car DI Diesel Engines, SAE Technical Paper 960870 (1996). This reference disclosed use of fuel injection pressures up to 1400 bar to lower PM emissions in diesel engines.

U.S. Pat. No. 5,315,973 to Hill generally discussed usage of "high" fuel injection pressures to reduce diesel emissions.

A 1999 report by the Union of Concerned Scientists disclosed the use of high fuel injection pressures to reduce particulate emissions in diesel engines through increasing air-fuel mixing, albeit at the cost of a coinciding potential increase in NOx formation.

U.S. Pat. No. 4,721,247 to Perr discussed use of higher fuel injection pressures to increase the efficiency of the combustion process and reduce PM emissions in diesel engines.

M. A. Ganser, Common Rail Injectors for 2000 bar and Beyond, SAE Technical Paper 2000-01-0706. This reference disclosed a desire for obtaining fuel injection pressures of 2000 bar or more (i.e. above the current state of the art) in furtherance of the search for better combustion and cleaner engine emissions in diesel engines.

Wickman, et al, Methods and Results from the Development of a 2600 bar Diesel Fuel Injection System, SAE Technical Paper 2000-01-0947. This reference speculated that higher fuel injection pressures may lower PM formation by providing a "higher injected momentum [which] results in faster fuel-air mixing, which results in a shorter heat release duration and higher peak cylinder pressures."

It was also known in the prior art that increases from low fuel injection pressures to conventional "high" fuel injection pressures had increased a combustion system's ability to tolerate the use of EGR by reducing the increase in PM formed with moderate EGR usage. See, e.g., Gerhard Stumpp, et al, Common Rail—An Attractive Fuel Injection System for Passenger Car DI Diesel Engines, SAE Technical Paper 960870, at 188 and FIG. 10 (1996); Godfrey Greeves, Advanced Two-Actuator EUI and Emission Reduction for Heavy Duty Engines, SAE Technical Paper 2003-01-0698, at 9, 11.

Despite this awareness that high fuel injection pressures may lead to benefits in lowering smoke formation in diesel emissions (with the traditional tradeoff of some corresponding increase in formation of NOx due to more vigorous combustion), fuel injector technology thus far has failed to provide commercially available fuel injectors utilizing injection pressures above about 30,000 psi (2,063 bar). Instead, fuel injection pressures of 1800 bar and below are considered to be "high enough," and sufficient for desired mixing benefits and emissions-reduction purposes. For example, the Hill '973 patent and the 1999 report by the Union of Concerned Scientists term pressures higher than 1000 atm (1000 bar) as "high" fuel injection pressures, and the 1999 report by the Union of Concerned Scientists discusses increasing fuel injection pressures to 1500 to 2000 bar, but not higher, to potentially further reduce particulate emissions with some potential tradeoff as to NOx. Typical state of the art "high pressure fuel injectors" deliver at 1350 bar to 1800 bar, which is considered sufficient by the industry. For example, the Greeves paper (SAE 2003-01-0698, at 2) states that current fuel injectors "already provide . . . high injection pressures with good durability for heavy-duty diesel applications." One high performance commercially available fuel injector delivers fuel at injection pressures around 2050 bar (slightly less than 30,000 psi). To applicant's knowledge, only experimental fuel injectors have utilized fuel injection pressures above this level.

There are various apparent reasons for the failure to utilize ultrahigh (defined for the purposes of this application as pressures above 30,000 psi (2063 bar)) fuel injection pressures in commercial diesel combustion applications. These reasons include leakage problems, cost, durability, undesirable losses in engine efficiency, undesirable increases in NOx formation, and discouraging results and predictions as to the ability of ultrahigh fuel injection pressures to result in continuing reductions in smoke formation in combustion. The combination of these factors results in an adverse cost/benefit balance that has previously militated against efforts to develop such fuel injection systems. Some of these disincentives to development of ultrahigh pressure fuel injection technology are brought out in prior art references above, as discussed below:

The Cost Side of the Cost/Benefit Balance for Ultrahigh Pressure Fuel Injection Systems: Increased Leakage Problems, Efficiency Losses, Costs, and Durability Concerns Use of ultrahigh fuel injection pressures necessarily entails addressing issues as to increased potential for leaks, engine efficiency losses due to leaks and the higher pressures needed to be maintained, increased costs in developing such a system, and in cracking and wear issues that could result from trying to use such high fuel injection pressures.

The Ganser paper (SAE Technical Paper 2000-01-0706), for example, is a good example of how even optimistic prior art discussions as to the potential benefits of fuel injection pressures above 2000 bar are tempered with discussion of admitted inabilities to handle problems such as the leakage that can occur at 2000 bar pressure levels and above. The Ganser paper explains that, with particular relevance at pressures above 1500 bar, fuel injector leaks are power losses that penalize engine efficiency, and that "[t]he higher the pressure, the bigger the power loss and at the same time the more difficult it becomes to seal parts or reduce leakage." Id. at 12. In presenting the increases in leakage with fuel injection pressure rise, the Ganser reference states that "[t]he leakage at the [top] system pressure of 2000 bar was not even measured, because it was too big." Id. at 14.

Likewise, U.S. Pat. No. 4,721,247 to Perr discloses the significant leakage and durability issues that occur with fuel injectors at pressures above 30,000 psi.

The Benefit Side of the Cost/Benefit Balance for Ultrahigh Pressure Fuel Injectors: Discouraging Results and Predictions as to the Ability of Ultrahigh Fuel Injection Pressures to Lower Smoke Formation without Significantly Increasing NOx Formation The prior art has not seen any significant benefits to increasing fuel injection pressures above state of the art high injection pressures of around 1800 bar.

The Flynn article discussed above (SAE Technical Paper 2000-01-1177) is a good example of the discouraging predictions in the prior art on the ability of combustion-improvement measures (e.g. use of even higher fuel injection pressures) to enable rapid diesel combustion and manageable smoke levels together with low NOx emissions. Indeed, the Flynn article argued that the minimum flame temperatures and NOx formation levels it found for diesel combustion "are driven by chemical fundamentals; therefore, they represent a boundary to rapid combustion that cannot be circumvented by system structural, composition or hydrodynamic changes." Flynn, SAE 2000-01-1177, at 89–90. Thus, following Flynn's prediction, ultrahigh pressure fuel injectors would be of no benefit, as they cannot enable rapid combustion or acceptable efficiency in a conventional diesel engine together with NOx-formation levels below about 1.0–1.5 g/bhp-hr, such as is performed in applicant's Controlled Temperature Combustion method of combustion disclosed in the parent application hereof (i.e. patent application Ser. No. 10/241,229, filed Aug. 8, 2002).

While Flynn, et al, thereafter acknowledged that their conclusions as to diesel minimum flame temperatures were "more uncertain" than as to spark-ignition engines, and thus "should be interpreted as only approximate due to the many simplifications involved" (Flynn, at 96, 99), the Flynn predictions nevertheless exemplify the prior art's steering away from any motivation to develop a fuel injection system with ultrahigh fuel injection pressures. It further typifies the uncompromising belief in the prior art that acceptable diesel combustion cannot be obtained at the high EGR levels, low charge-air oxygen concentration levels, and/or low peak combustion temperatures utilized in low temperature combustion efforts.

Because of the above, the only known experiments on the PM-reducing effects of ultrahigh fuel injection pressures did not try the ultrahigh fuel injection pressures in conjunction with high EGR levels, low charge-air oxygen concentration levels, and/or low peak combustion temperatures. Two examples are given below.

As one example, the Wickman prior art above (SAE Technical Paper 2000-01-0947) tested ultrahigh peak pressure (2600 bar) fuel injectors for effects on NOx and PM diesel emissions. The injectors were not tested in conjunction with high EGR levels, low charge-air oxygen concentration levels, and/or low peak combustion temperatures. As a result, the Wickman injectors produced only mixed results at best, often resulting in higher PM and/or NOx levels than obtained with conventional fuel injection systems. This disappointing result also stemmed in part from the design of the fuel injectors, which were cam-driven and dependent on high engine speeds and loads. In other words, the Wickman injectors were incapable of producing ultrahigh fuel injection pressures except at high speeds and loads, and therefore generally did not produce improved emissions results except at those particular speeds and loads.

As a second example, U.S. Pat. No. 4,721,247 to Perr disclosed a fuel injector capable of reaching fuel injection pressures of 35,000 psi (approx. 2407 bar). However, the Perr '247 patent does not present any emissions-reduction benefits obtained with the invention, and does not discuss potential use of such injectors with high EGR levels, low charge-air oxygen concentration levels, and/or low peak combustion temperatures. In addition, like the Wickman injectors, the Perr '247 injection system only reaches its high injection pressures at very high engine speeds (5,000 rpm), and is unable to provide high injection pressures at moderate or low engine speeds. As such, the Perr '247 fuel injection system would be ineffective in significantly reducing PM formation across an entire engine operating map.

Finally, neither the Wickman injectors nor the Perr '247 injector appear to have been developed as a product, perhaps therefore reflecting conventional industry opinion (and that of fuel injection designers) that obtaining fuel injection pressures above state of the art levels provides no additional significant emissions-reduction benefits and does not justify the additional expense of production of such units on a cost/benefit analysis basis.

SUMMARY OF THE INVENTION

The present invention provides a commercially acceptable diesel combustion system that can meet environmentally acceptable levels of NOx emissions (i.e. 0.2 g/bhp-hr or lower across a full map of engine speeds and loads) without the need for use of NOx aftertreatments, and simultaneously maintain engine-out PM emissions relatively close (i.e. with smoke levels at or below 3 BSN, preferably below 1.5 BSN) to environmentally acceptable post-aftertreatment levels.

In order to obtain the unique emissions results it does, applicant's diesel combustion system generally operates within a unique combination of parameters. These parameters bounding the zone of acceptable operation of the system are approximately as follows: (1) charge-air oxygen concentration taken into the cylinder should stay below 16%, preferably between 10% and 15%, more preferably between 11.5% and 14%, and most preferably between 12% and 13.5%, which can be achieved through use of high EGR levels, (2) fuel injection pressures should preferably be at least 30,000 psi (2063 bar), more preferably above 2300 bar, and most preferably around 2500 bar or higher, at most engine speeds and loads, although satisfactory (but less ideal) emissions performance may also be obtainable at slightly lower injection pressures (e.g. above 1800 bar), and (3) charge-air mass/fuel mass ratios should stay between 25:1 and 45:1 for medium and high loads in order to reduce bulk combustion temperatures and provide sufficient oxygen mass for good combustion. In addition, in conjunction with use of a conventional particulate trap for PM aftertreatment, the engine is also preferably run at a continuously lean operation (with excess oxygen therefore available throughout the operating range) in order to further reduce PM formation somewhat and maintain a balance point for continuous trap regeneration during operation.

DETAILED DESCRIPTION OF THE INVENTION

Figure 1:
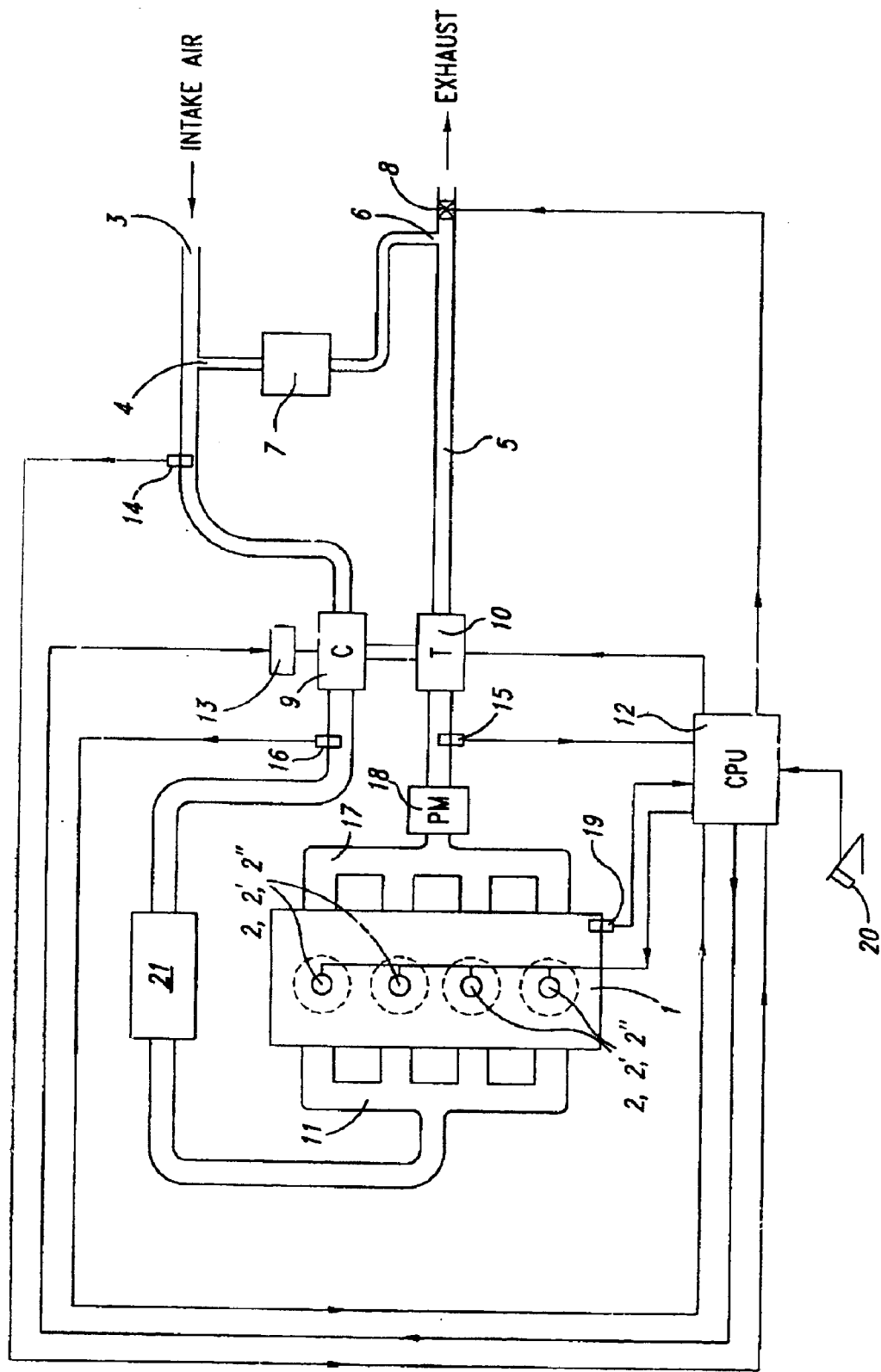
FIG. 1 is a schematic view of the preferred embodiment of the combustion system of the present invention.

As stated above, this application is a continuation-in-part of applicant's Controlled Temperature Combustion patent application (Ser. No. 10/214,229). That parent application sets forth, among other things, applicant's success in utilizing and maintaining low charge-air oxygen concentration levels (down to around 12%) in diesel combustion in order to reduce localized peak combustion temperatures and thereby reduce diesel NOx formation. As a result, applicant was able therein to consistently obtain engine-out NOx emission levels below 0.2 g/bhp-hr at all engine speeds and loads. However, the parent application hereto did not fully address methods to reduce PM and smoke to manageable levels, and improve engine efficiency, in conjunction with that controlled temperature combustion system.

The present invention continues to use charge-air oxygen concentration levels significantly below the prior art (i.e. below 16%) at virtually all engine speeds and loads[3], keeping charge-air oxygen concentrations preferably between 10% and 15%, more preferably between 11.5% and 14%, and most preferably between 12% and 13.5%. In addition, however, the present invention provides additional means to significantly reduce smoke levels, and maintain engine efficiency, while simultaneously keeping NOx emission levels low. The present invention accomplishes these tasks by making the invention's low charge-air oxygen concentrations tolerable for good engine combustion in part through the use of extremely high fuel injection pressures not previously used in the prior art.

[3] Such low oxygen concentration levels are not necessary at no-load conditions, nor at low load conditions, to keep NOx within environmentally acceptable levels.

As a result of the foregoing, and as stated above, applicant's diesel combustion system therefore generally operates within a unique combination of parameters. These parameters comprise: (1) inlet oxygen concentration below 16%, preferably between 10% and 15%, more preferably between 11.5% and 14%, and most preferably between 12% and 13.5%, (2) fuel injection pressures at or exceeding 1800 bar, preferably exceeding 2100 bar, more preferably exceeding 2300 bar, and most preferably around 2500 bar or higher, at most engine speeds and loads, and (3) charge-air mass/fuel mass ratio between 25:1 and 45:1 for medium and high loads. Furthermore, the system is preferably run continuously slightly lean of stoichiometry, providing just enough excess oxygen to facilitate completeness of combustion and to maintain an exhaust oxygen level sufficient for continuous trap regeneration at a balance point in operation.

These parameters will each now be discussed in turn.

Parameter 1: Charge-air Oxygen Concentration

In the present invention, the inlet oxygen concentration is preferably reduced by means of EGR. An inlet oxygen concentration kept below 16%, preferably between 10% and 15%, more preferably between 11.5% and 14%, and most preferably between 12% and 13.5%, generally requires EGR ratios above 40%. The preferred embodiment of the present invention in fact frequently runs at EGR ratios significantly higher than 50%.

Generally speaking, the greater the fuel injection pressure used, the lower the intake charge-air oxygen concentration may be without a significant increase in PM formation (see FIG. 3), with the higher fuel injection pressures assisting in improving the extent of oxygen utilization in the dense, dilute oxygen environments.[4] Thus it has also been discovered that higher fuel injection pressures and other combustion system optimizations allow the lower limit of acceptable oxygen concentrations to decrease, thereby providing a larger range in which acceptable emissions performance may be obtained. Currently, for example, acceptable engine performance may be obtained at charge-air oxygen concentrations approximately 10% or higher. Although with further fuel injection pressure increases and/or optimizations of the combustion process, acceptable combustion is likely to be obtainable at charge-air oxygen concentrations even lower than 10%, an intake charge-air oxygen concentration below 10% is not likely to be needed in combustion.

[4] For the same reason, greater fuel injection pressure also allows use of lower exhaust oxygen concentrations if desired, allowing lower boost levels.

On the other hand, of course, there must be sufficient oxygen overall for the quantity of fuel to be burned to allow complete combustion. In fact, as mentioned above, the preferred embodiment of the invention preferably runs lean of stoichiometry, providing sufficient excess oxygen to allow for near complete combustion of the fuel despite less than perfect mixing and combustion conditions. This further allows for a sufficient level of oxygen remaining in the exhaust to permit regeneration of a particulate trap if desired. Emissions reduction is best optimized in one preferred embodiment if the exhaust oxygen concentration is continuously maintained at a level just sufficient to provide for continuous trap regeneration (e.g. between about 2% to about 6%), without the requirement for periodic lean excursions for trap regeneration to occur.

Furthermore, because of the lower oxygen concentrations used for the charge-air in the present invention, supplying a sufficient overall molar oxygen amount for complete combustion frequently involves the use of boost levels significantly higher than conventional boost levels for a given power demand. In other words, a greater quantity of the low oxygen concentration charge-air must be used in order for sufficient overall oxygen to be present in the cylinder for full combustion of the fuel amount corresponding to the given power demand on the engine. This additional boost also leads to a greater charge-air density than would otherwise be needed in a conventional diesel combustion system, particularly at higher loads. For example, higher loads require higher oxygen mass overall, and therefore higher boost along with the reduced charge-air oxygen concentration level.

Keeping intake oxygen concentrations within desired critical ranges is important. If the intake oxygen concentration is too low for a quantity of fuel, incomplete combustion and an undesirable increase in PM formation will occur. On the other hand, if the intake oxygen concentration is too high, localized formation of NOx will occur, facilitated by localized high temperature regions coinciding with areas of excess oxygen in the combustion mixture wherein the localized heat release is not sufficiently constrained. Having an effective method and strategy for air handling to maintain intake charge-air oxygen concentration within this desirable range (to limit localized heat release but still sufficient to maintain and complete combustion) over all normal operating conditions is therefore important in achieving the low emission results obtained with the present invention, although no single method or strategy is particularly required for the successful implementation of the present invention.

A preferred embodiment for a combustion system capable of maintaining intake charge-air oxygen concentration within this desirable range will now be set forth.

Preferred Embodiment for Control of the Combustion System of the Present Invention The preferred embodiment of the combustion system, enabling fast control of charge-air oxygen concentration levels taken into the cylinder, is shown in FIG. 1.

Referring to FIG. 1, an internal combustion diesel engine 1 is shown. Engine 1 receives fuel through direct cylinder fuel injectors 2, 2', 2", etc. Ambient air enters at port 3. Exhaust gas blends with the ambient air at port 4, thereby forming the charge-air mixture. Exhaust gas is routed from exhaust pipe 5 at port 6 through exhaust gas cooler 7 to port 4. EGR control valve 8 is located just downstream of port 6 in exhaust pipe 5. By restricting flow through valve 8, exhaust gas flow rate through port 6 is controlled. The combined ambient air and recirculated exhaust gas (collectively "charge-air") flows through and is compressed by compressor 9. Compressor 9 may be a single stage compressor or two or more compressors in series or parallel, and is primarily driven by exhaust gas expander (turbine) motor 10 (which may be a single stage turbine or two or more turbines in series or parallel) to provide a controlled boost pressure level to intake manifold 11. Controller (CPU) 12 sends appropriate signals to expander motor 10 to control boost. An optional electric or hydraulic motor 13 may be used and controlled by controller 12 to provide rapid boost level changes to assist the exhaust expander motor 10 in providing rapid torque response. Alternatively, a supercharger (within the compressor 9 representation) may be used to provide more rapid torque response and additional boost capability. Controller 12 therefore sends appropriate signals to motor 13 and/or to the supercharger 9 to control boost level during transients and during any operating conditions where motor 10 alone cannot supply sufficient and fast boost pressure.

Compressed charge-air may optionally (and preferably) flow through cooler 21 to intake manifold 11 to cool the charge-air to specified levels, if desired.

Optional oxygen sensor 14, placed in the intake line downstream of combining recirculated exhaust gas with the ambient air, may be used to directly determine the oxygen concentration in the charge-air. In addition, or in the alternative, an exhaust oxygen sensor 15 may be used. Charge-air oxygen concentration may then be determined from the exhaust oxygen concentration and EGR ratio, or by other means. Charge-air oxygen concentration may also be calculated or determined from other sensed parameters (not necessarily shown) by methods well-known to those skilled in the art.

Charge-air enters the combustion chamber (not shown) through conventional valves (not shown) in a conventional manner and exhaust gases leave the combustion chamber through conventional valves (not shown) and leave engine 1 through exhaust manifold 17. Exhaust aftertreatment device 18 may include a particulate trap oxidizer to remove any particulate emissions and a catalyst to oxidize residual fuel and carbon monoxide. Engine speed is provided to controller 12 by speed sensor 19. Torque command level is provided to controller 12 by accelerator pedal sensor 20.

Figure 2:
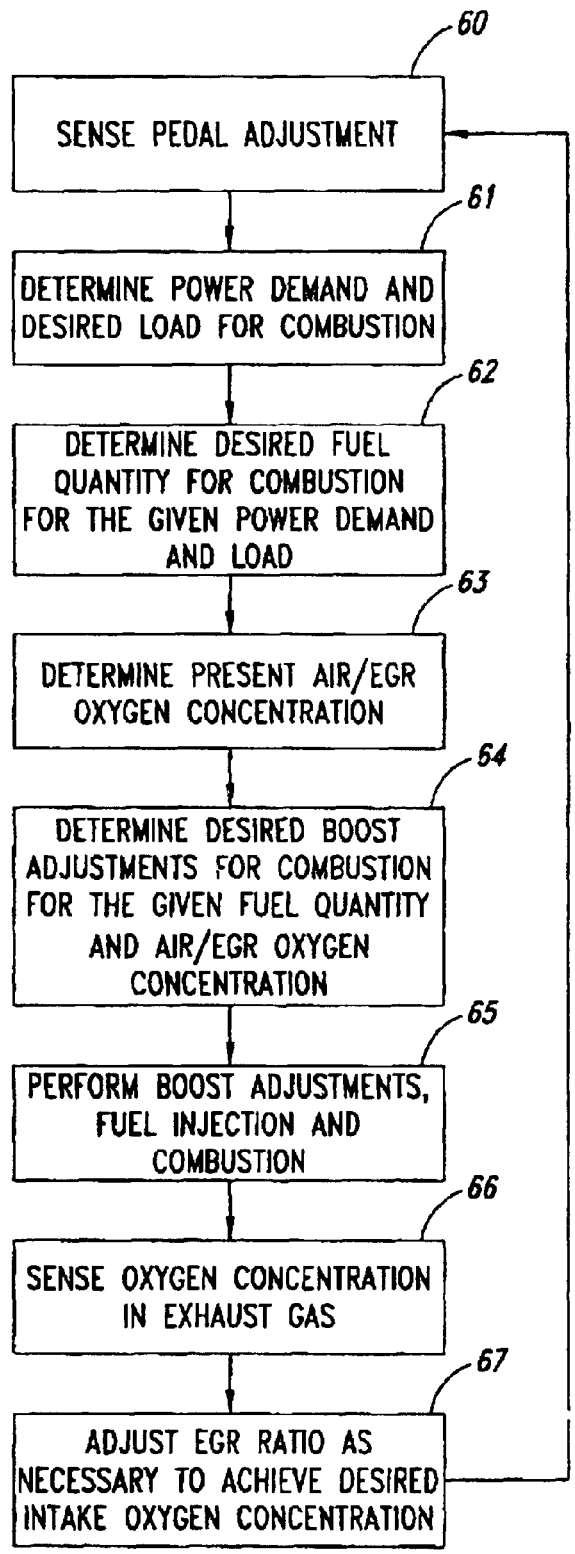
FIG. 2 is a flow chart of the preferred embodiment of the air handling control method of the present invention.

While there is no single, particular method required for the control of EGR, boost, and fuel adjustments in the present invention to meet the desired parameters set forth herein, the current "best mode" for simplified control of the present invention to meet the desired emissions results is depicted in FIG. 2. Additional methods, particularly for improved emissions control during rapid transients, are the subject of a separate, commonly assigned continuation-in-part ("Methods for Low Emission, Controlled Temperature Combustion in Engines Which Utilize Late Direct Cylinder Injection of Fuel") to the same parent application hereto, which companion continuation-in-part application is also incorporated herein by reference.

Referring to FIG. 2, operation control begins with step 60, wherein a change in the driver's demand for engine power is sensed and communicated to controller 12 by pedal sensor 20. In step 61, controller 12 then utilizes maps established and stored therein to determine the desired load for combustion given the driver's power demand. In step 62, controller 12 next determines the desired fuel quantity for combustion given the desired load and engine speed (monitored by engine speed sensor 19) to meet the driver's power demand, as also taken from maps established and stored in controller 12. The oxygen concentration of the air/EGR mixture (i.e. charge-air) may be provided to controller 12 in step 63 by optional oxygen sensor 14, or by calculation from other engine operating conditions.

In step 64, controller 12 determines desired boost adjustments for combustion, from maps stored therein, for the given fuel quantity determined from step 62 (or from the desired load determined in step 61) and the current air/EGR oxygen concentration determined in step 63. The desired boost level for combustion is determined so as to (i) provide sufficient charge-air mass to obtain desired charge-air/fuel mass ratios, (ii) provide a sufficient molar amount of oxygen for full combustion of the given fuel quantity, and (iii) preferably provide an amount of excess oxygen that will improve combustion and result in a target exhaust oxygen concentration that will allow for regeneration of optional PM trap 18, but that will not result in any significant increase in NOx formation. The particular boost level for a given quantity of fuel or desired load may be mechanically determined and programmed into controller 12 from these guidelines without undue experimentation, as will be understood in the art.

For closed loop control of oxygen concentration in the preferred combustion system, after combustion occurs in step 65, exhaust oxygen concentration may be sensed or determined in step 66, and EGR ratio adjustments may be made in step 67 to trim and control the system to the target desired intake oxygen concentration value or range. For example, the exhaust oxygen concentration may be read from sensor 15 and/or intake charge-air oxygen concentration may be read from sensor 14, with controller 12 comparing actual or calculated (i.e. determined) charge-air oxygen concentrations to the desired level for the actual operating point (from stored maps), and thereafter commanding EGR valve 8 to adjust to achieve the target oxygen concentration.

In addition, boost adjustments may also be controlled on a closed loop basis, with actual boost levels sensed by intake pressure sensor 16 being compared by controller 12 to the desired level from stored maps, and motors 10 and 13 (or a supercharger) adjusted as appropriate to achieve the target boost level.

Control of oxygen concentration in the present invention may additionally be improved, giving improved transient response times, by efforts to minimize the oxygen corrections that must be made for operation within the parameters of the present invention. For example, the preferred method for control of the present invention could additionally include maintaining the oxygen concentration in the engine exhaust to a relative constant. The particular value chosen is not necessarily critical, and could be a value such as 3%, or 5%, or 7%. Exhaust oxygen concentration may be maintained to a relative constant by matching the quantity of fuel used with the amount of in-cylinder oxygen available to produce the desired exhaust oxygen concentration. With the oxygen concentration in the exhaust relatively constant (e.g. at 5%), and with the oxygen concentration of ambient air also relatively constant (i.e. approximately 21%), a charge-air oxygen concentration within the critical oxygen concentration range may then also be fixed (e.g. at a preferred level such as 12.5%) for virtually all engine speeds and loads, which concentration may be obtained simply by maintaining the EGR ratio at the corresponding setpoint for the desired intake oxygen concentration (i.e. approximately 53% EGR here, at the given exhaust oxygen concentration value of 5%).

The desirability of maintaining exhaust oxygen concentration and intake charge-air oxygen concentration to acceptable relative constant values is so that the system's air handling response to meet transients (thereby requiring a change in the overall oxygen amount required for complete combustion in the cylinder) may generally be paced solely by adjusting the mass of air to be supplied (i.e. boost response), rather than also requiring the slower step of simultaneous determination and/or adjustment of oxygen concentration levels in order for the engine demand to be met. Transient response paced primarily by boost pressure allows the engine system's response time with controlled oxygen concentration levels to be on the same basis as conventional diesel engine response times.

Parameter 2: Very High Fuel Injection Pressures

The obstacles preventing prior art development of commercially available fuel injection systems capable of very high fuel injection pressures were discussed above. The present invention itself is not directed toward solution of the technical barriers to development of an ultrahigh pressure fuel injection system. The present invention instead changes the cost/benefit balance for ultrahigh pressure fuel injection systems by increasing the benefits obtainable by use of such pressure levels. In particular, the ability to obtain simultaneously low PM and NOx engine out diesel emission levels with good engine efficiency constitutes a great benefit. Therefore, the present invention is not limited to any specific fuel injection system, as long as the system can provide the fuel injection pressures called for herein.

In particular, applicant has discovered that for a diesel combustion system like the present invention that seeks to use charge-air oxygen concentration levels below 16%, very high fuel injection pressures significantly help to reduce the amount of PM formed at those EGR levels. This is likely because of the very oxygen-dilute charge-air mix resulting from the particularly high levels of EGR, which therefore needs a significantly greater mixing action (facilitating faster contact and interaction between available oxygen molecules) in order to get substantially complete combustion and low PM emissions. It has been found that ultrahigh fuel injection pressures provide significant benefits over conventional "high pressure" fuel injectors in reducing PM formation in the dilute and dense charge-air mixtures frequently found in applicant's combustion system.

Following the above procedures, applicant has notably also found that, if the low charge-air oxygen concentration levels of the present invention are kept sufficiently low (most preferably about 12–13.5%), the ultrahigh fuel injection pressures used in the present invention do not result in any significant corresponding leap in formation of NOx. This results in a very favorable alleviation of the NOx-PM tradeoff for diesel combustion. Applicant has therefore successfully made and tested novel fuel injection systems at levels such as 2300, 2400, and over 2500 bar pressures (including 3000 bar and more) at these oxygen levels for various engine speeds and loads, with significant PM reduction benefits simultaneous with low NOx formation. This phenomenon may perhaps be explained as simultaneously (i) providing sufficient oxygen and fast mixing action to maintain rapid combustion (thereby presumptively keeping localized temperatures and heat release per unit above a minimum chemically fundamental level needed for the chemical reactions to rapidly occur for combustion), while (ii) limiting heat release per unit mass of charge-air by reducing the relative availability of oxygen within that unit mass such that combustion temperatures within that unit mass do not exceed the significant NOx-formation threshold (about 2000K).

Figure 3:
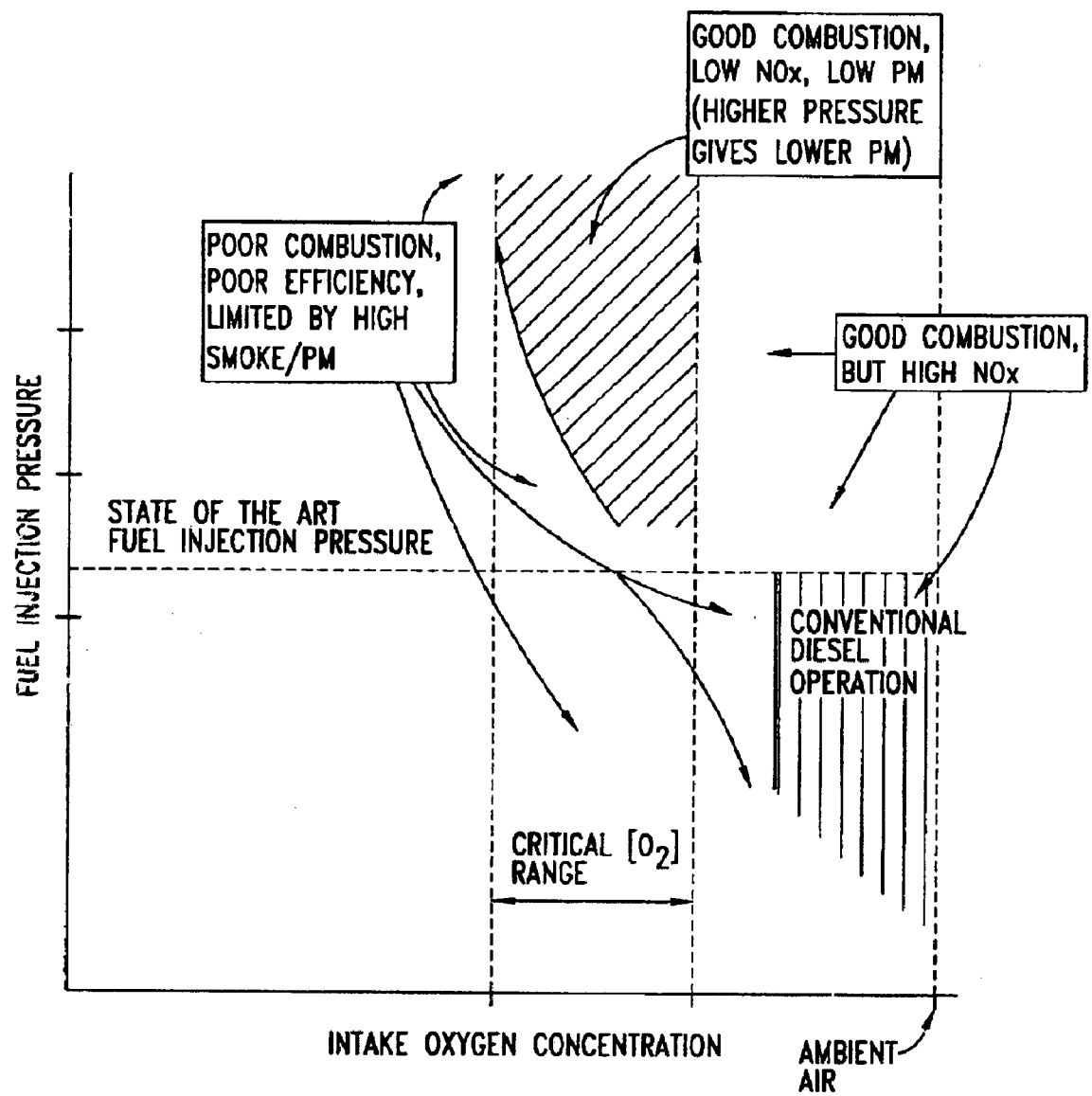
FIG. 3 is a representative view of the relationship between fuel injection pressure and intake charge-air oxygen concentration for low-emission diesel combustion of the present invention, enabling environmentally acceptable NOx levels simultaneously with manageably-low PM formation and good engine efficiency.

As discussed above, the present invention has achieved successful operation at fuel injection pressures of around 2000 bar or higher. Applicant expects that successful operation can be obtained with further refinements and without undue experimentation, down to around 1800 bar fuel injection pressure, but that the best and broadest zone of acceptable performance will continue to be obtained at very high fuel injection pressures. FIG. 3 portrays this relationship between increasing fuel injection pressure and a corresponding increase in the range of oxygen concentrations allowable for low emission diesel combustion. The increased range of acceptable oxygen concentrations at very high fuel injection pressures provides desirable leeway allowing for increased toleration of variances in oxygen concentration that may occur in transients.

These fuel injection pressures have been achieved by applicant through use of an hydraulically intensified common rail fuel injection system, designed to be capable of providing such high fuel injection pressures at any engine speed and load.

Figure 4:
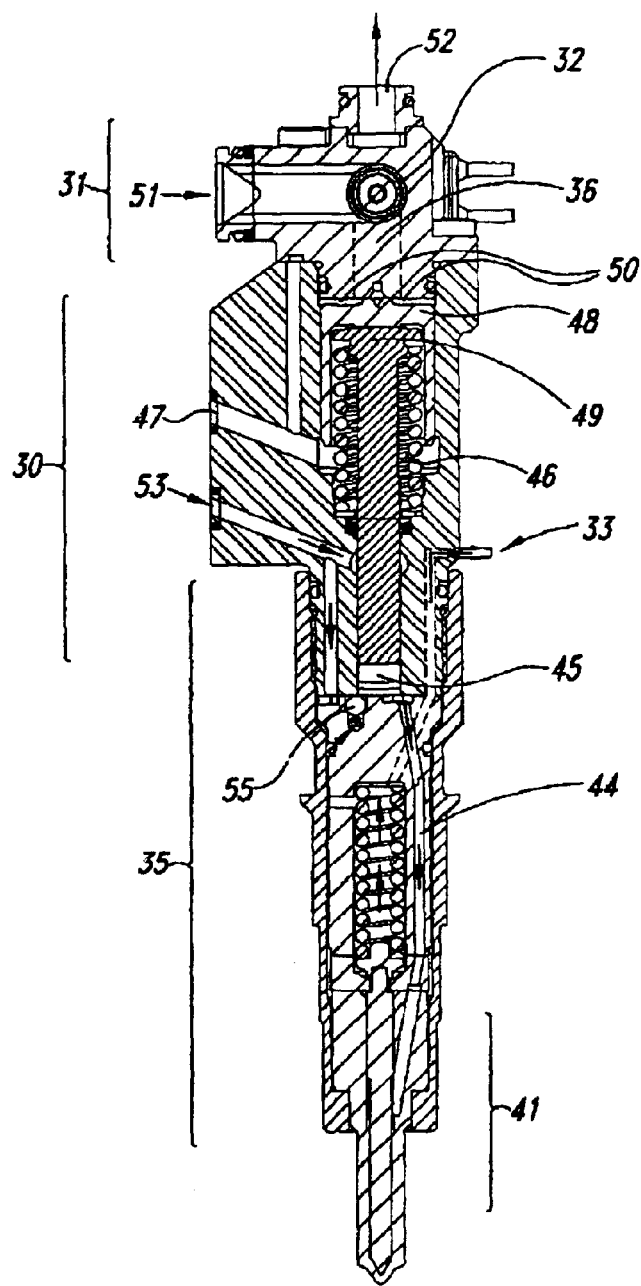
FIG. 4 is a side sectional view of a preferred fuel injector for use with the present invention.

The fuel injector displayed in FIG. 4 is but one (preferred) embodiment of a fuel injector enabling the fuel injection requirements of the present invention. This preferred embodiment operates as a conventional common rail fuel system, with a higher injection pressure. The system allows control of fuel injection pressure locally up to 3,000 bar or more using hydraulic fluid intensification effect in the injector body, and may be operated by controller 12.

Referring to FIG. 4, the preferred injection system is comprised of an intensifier body 30 and a cap nut 35 to make the injector housing which can be designed to fit any engine cylinder head requirements. The intensifier body 30 is bored to fit an electronic control valve 31, which can be positioned in different ways in the injector and can be sized to satisfy several engine applications. The electronic control valve 31 houses a fast response spool valve 32 to allow supply of high pressure fluid and to vent low pressure fluid. The injection system preferably utilizes low pressure supply fuel (e.g. 3–4 bar), and a higher pressure (e.g. 200 bar) hydraulic supply system. The higher pressure hydraulic fluid is supplied via hydraulic fluid passage 36 and returns via hydraulic return port 52. Spool valve 32 can be either a three-way or two-way valve, or another valve type providing said function.

The intensifier body 30 is also bored to contain a plunger 49, piston 48 and return spring 46. The spring 46, plunger 49 and piston 48 in the injector intensifier assembly 30 pressurize the fuel in the accumulative fuel chamber 45 to the desired pressure, up to 3,000 bar and above. The intensifier body 30 contains fuel return port 33, fuel supply port 53 at low pressure (e.g. 3–4 bar), and atmospheric pressure hydraulic passages and drains (not shown). In the lower part of the intensifier body 30 is the high pressure (e.g up to 3,000 or more bar) accumulative fuel chamber 45. The high pressure fuel passage 44 allows communication between the high pressure fuel chamber 45 and the injector nozzle 41. Confining the high pressure fuel within fuel chamber 45, fuel passage 44, and nozzle 41 provides a high safety factor in the engine fuel system. Fuel leakage from the nozzle 41 needle valve communicates with the fuel return port 33.

The spool valve 32 is preferably a three-way, two position valve. The first position (open) connects hydraulic fluid supply (from port 51) to hydraulic fluid passage 36, and the second position (closed) connects hydraulic fluid passage 36 to hydraulic return 52. In the open position, spool valve 32 allows hydraulic fluid from the hydraulic supply port 51 to flow into the hydraulic chamber 50, thereby moving the piston 48 and plunger 49 assembly (intensifier assembly) downward to pressurize the captured fuel in the accumulative chamber 45. Fuel pressure in the fuel chamber, dictated by hydraulic pressure and flow into hydraulic chamber. 50, can always be at optimum levels independent of engine speed and load. This permits complete control of peak injection pressure, duration, and quantity of fuel injected. The action of spool valve 32 can therefore be interfaced with controller 12 (FIG. 1) to control injection pressure, timing, and fuel delivered quantity without the drawbacks of hydraulic delays.

When spool valve 32 is in closed position the hydraulic fluid above the piston 48 in hydraulic chamber 50 returns to a low pressure hydraulic tank (not shown) and the plunger 49 and piston 48 assembly moves upward by the return spring 46, then the fuel accumulative chamber 45 is refilled through the check valve assembly 55 for the next pressure cycle. Hydraulic leaks in the system are vented through hydraulic vent port 47.

Parameter 3: Charge-Air Mass/Fuel Mass Ratio at Medium and High Loads

This parameter has to do with keeping peak bulk and localized temperatures down in combustion in order to reduce NOx formation. The charge mass/fuel mass ratio affects the bulk heat capacity in combustion and therefore reduces bulk temperature increases in combustion. The parameter is phrased in terms of a charge mass/fuel mass ratio instead of temperature in order to provide both an easily measurable and manipulable parameter that ensures that bulk and local peak combustion temperatures stay below significant NOx-forming thresholds. As discussed in the parent Controlled Temperature Combustion patent application (U.S. application Ser. No. 10/214,229), incorporated herein by reference, a preferred strategy for lowering and controlling peak combustion temperatures through adjusting the heat capacity of the charge-air fuel mixture is by manipulating charge-air density through controlling the boost pressure of the charge-air in the intake system.

Note that for no load and light load situations, mass ratios do not need to be maintained between 25:1 to 45:1 for acceptable NOx and PM emissions as long as excess oxygen is generally used.

Figure 5A:
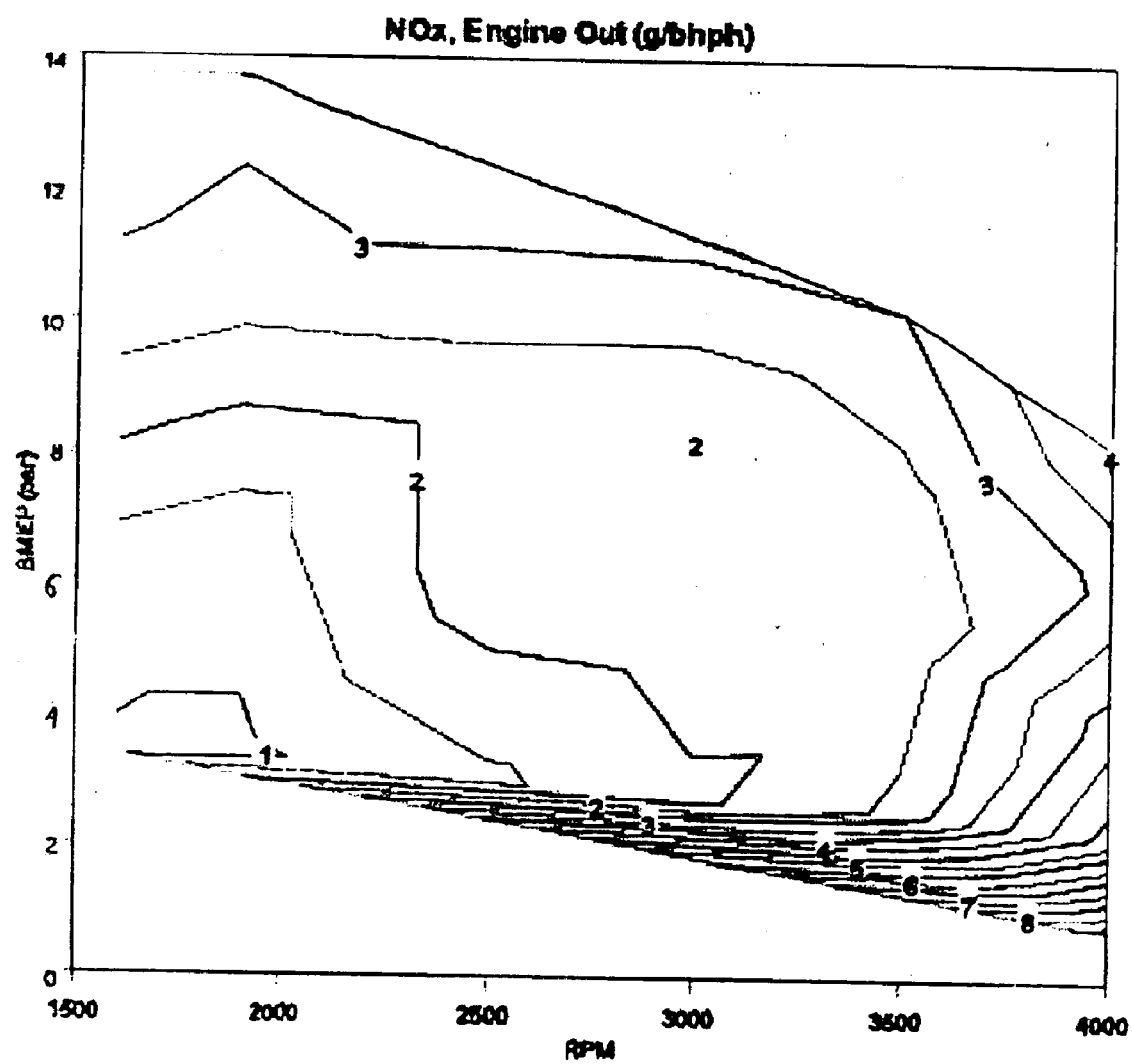
FIG. 5A is a view of NOx emission results for a typical conventional diesel engine.
Figure 5B:
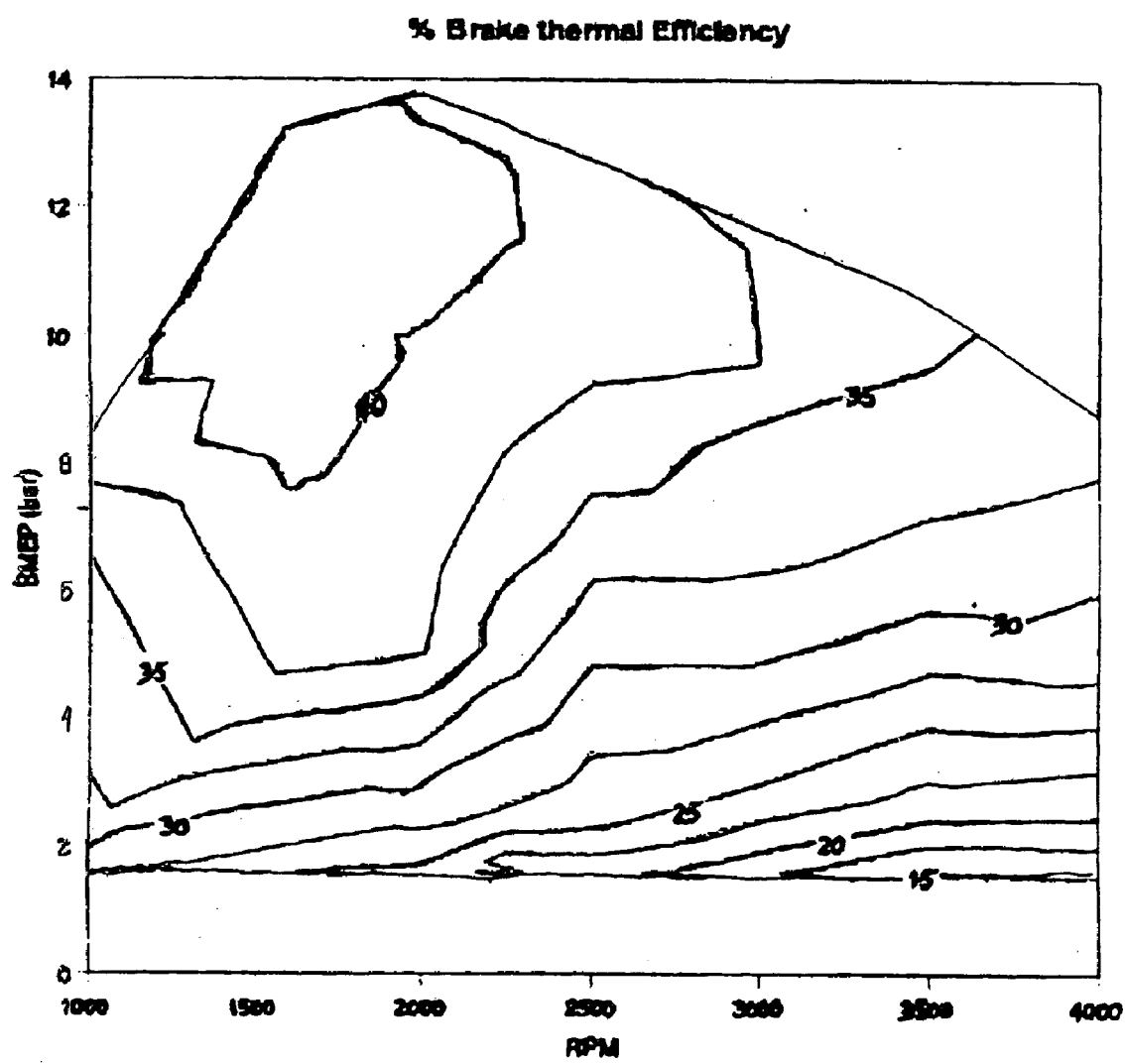
FIG. 5B is a view of engine efficiency results for a typical conventional diesel engine.
Figure 6A:
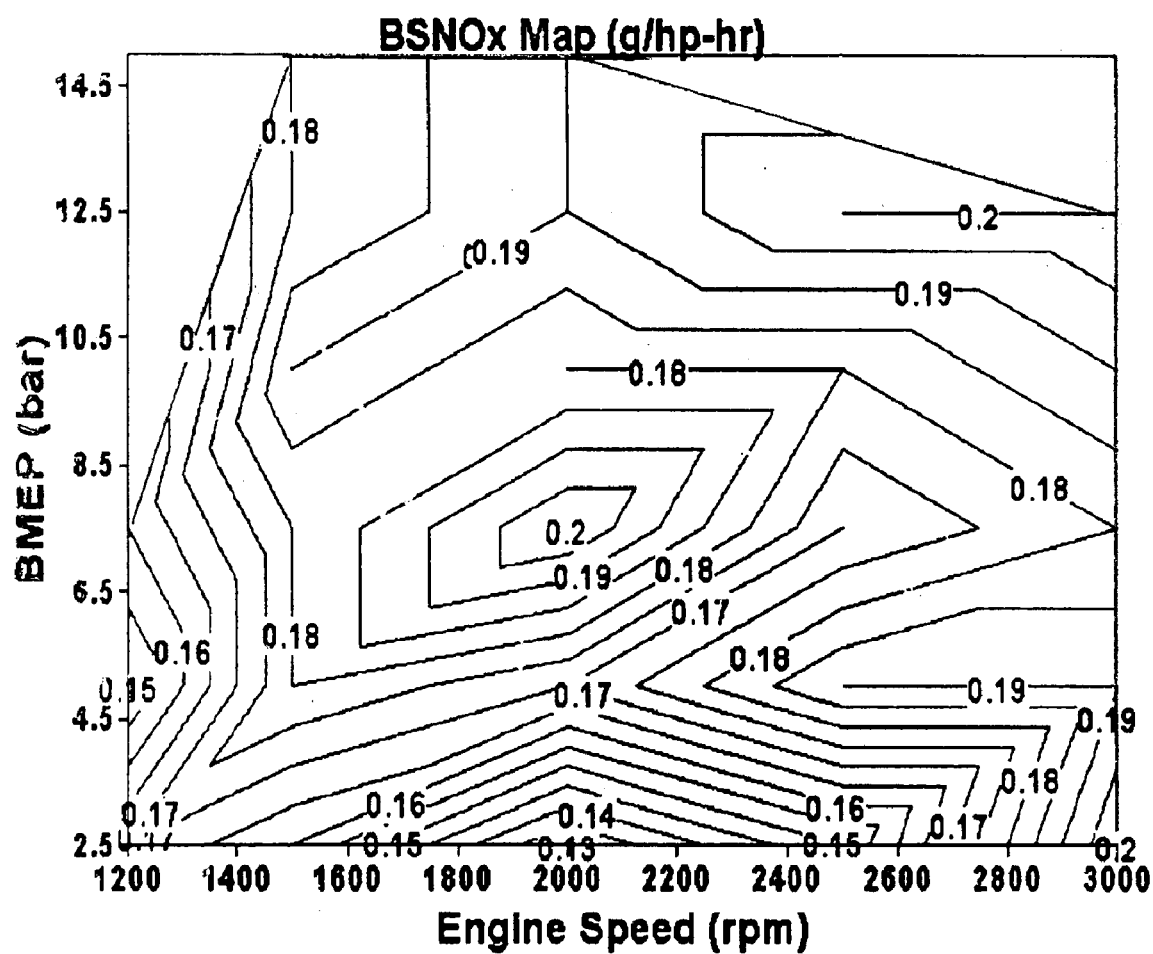
FIG. 6A is a view of NOx emission results for a diesel engine structurally equivalent to that tested for FIGS. 5A and 5B, except as modified to allow operation under the method of the present invention, showing engine-out NOx production levels within environmentally acceptable levels throughout the engine operating map.
Figure 6B:
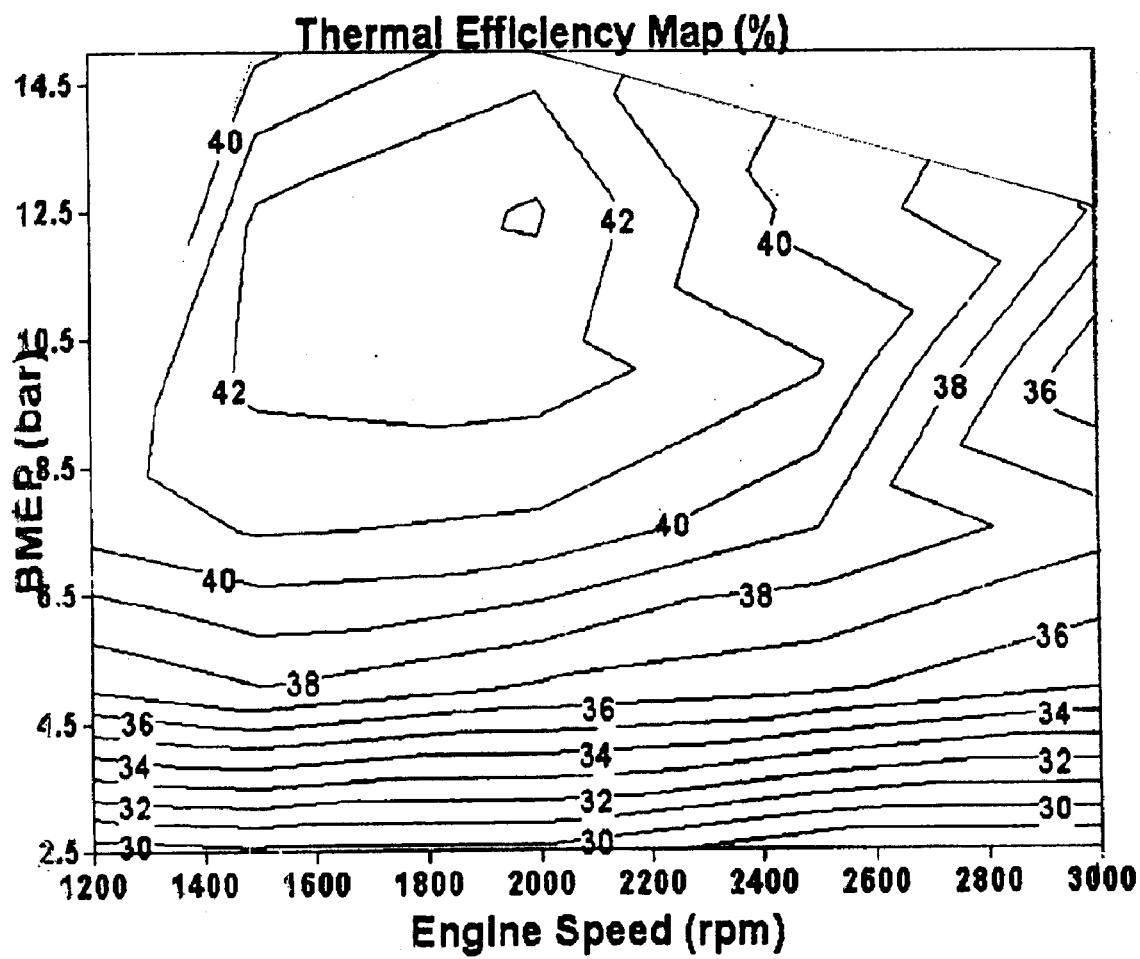
FIG. 6B is a view of engine efficiency results for a diesel engine structurally equivalent to that tested for FIGS. 5A and 5B, except as modified to allow operation under the method of the present invention, showing engine efficiency equal to or better than that obtained under conventional diesel combustion.

FIGS. 6A and 6B demonstrate certain benefits received from operation of a diesel engine under the methods of the present invention as compared to the prior art represented in FIGS. 5A and 5B. As shown in FIG. 6A, for example, NOx emissions under the present invention are many times lower than those produced by an equivalent conventional diesel engine (as shown in FIG. 5A) for virtually all engine speed and load conditions. Furthermore, as shown in FIG. 6B, such tremendous reductions in NOx emissions are achieved while still maintaining engine efficiencies equal to or greater than that of the prior art (as shown in FIG. 5B). The present invention is therefore capable of achieving the emission levels set forth in this application in a robust, commercially viable diesel engine.

From the foregoing it will be appreciated that, although specific embodiments of the invention have been set forth herein, various modifications may be made without deviating from the spirit and scope of the invention. The embodiments presented herein are therefore to be considered as illustrative and not restrictive, with the scope of the invention limited only by the claims appended hereto.

We claim:

1. A method of operating an internal combustion diesel engine comprising:
    taking into a combustion chamber of an internal combustion diesel engine a mixture of air and recirculated exhaust gas, wherein the oxygen concentration of said mixture of air and recirculated exhaust gas is below 16%;
    injecting fuel into said combustion chamber at a fuel injection pressure exceeding 1800 bar; and
    combusting said fuel in said combustion chamber with said mixture of air and recirculated exhaust gas, thereby producing useful work and a new quantity of exhaust gas, said new quantity of gas containing a level of nitrogen oxides (NOx) less than 1.0 gram per horsepower-hour of work performed by the engine.

2. The method of claim 1, wherein the oxygen concentration of said mixture of air and recirculated exhaust gas is below 15%.

3. The method of claim 1, wherein the oxygen concentration of said mixture of air and recirculated exhaust gas is below 14%.

4. The method of claim 1, wherein the oxygen concentration of said mixture of air and recirculated exhaust gas is maintained between 10% and 15% for medium and high loads.

5. The method of claim 1, wherein the oxygen concentration of said mixture of air and recirculated exhaust gas is maintained between 11% and 14% for medium and high loads.

6. The method of claim 1, wherein the oxygen concentration of said mixture of air and recirculated exhaust gas is maintained between 12% and 13.5% for medium and high loads.

7. The method of claim 1, wherein the oxygen concentration of said mixture of air and recirculated exhaust gas is maintained relatively constant from cycle to cycle.

8. The method of claim 1, wherein an EGR ratio and the oxygen concentration of the exhaust gas are maintained relatively constant from cycle to cycle.

9. The method of claim 1, wherein the mixture of air and recirculated exhaust gas comprises an EGR level of greater than 40% at medium or high loads.

10. The method of claim 1, wherein the mixture of air and recirculated exhaust gas comprises an EGR level of greater than 50% at medium or high loads.

11. The method of claim 1, wherein said fuel is injected into said combustion chamber at a fuel injection pressure that meets or exceeds 2000 bar.

12. The method of claim 1, wherein said fuel is injected into said combustion chamber at a fuel injection pressure that meets or exceeds 2100 bar.

13. The method of claim 1, wherein said fuel is injected into said combustion chamber at a fuel injection pressure that meets or exceeds 2300 bar.

14. The method of claim 1, wherein said fuel is injected into said combustion chamber at a fuel injection pressure that meets or exceeds 2500 bar.

15. The method of claim 1, wherein said fuel is injected into said combustion chamber at a fuel injection pressure that meets or exceeds 3000 bar.

16. The method of claim 1, wherein said new quantity of exhaust gas contains a level of nitrogen oxides (NOx) less than or equal to 0.5 grams per horsepower-hour of work performed by the engine.

17. The method of claim 1, wherein said new quantity of exhaust gas contains a level of nitrogen oxides (NOx) less than or equal to 0.2 grams per horsepower-hour of work performed by the engine.

18. The method of claim 1, wherein the level of nitrogen oxides (NOx) are maintained equal to or below 0.2 grams per horsepower-hour of work performed by the engine at substantially all engine speeds and loads.

19. The method of claim 1, wherein said new quantity of exhaust gas has a smoke content at or below a Bosch Smoke Number of 3 before or without aftertreatment.

20. The method of claim 1, wherein said new quantity of exhaust gas has a smoke content at or below an average Bosch Smoke Number of 1.5 before or without aftertreatment.

21. The method of claim 18, wherein said new quantity of exhaust gas also has a smoke content at or below a Bosch Smoke Number of 3 before or without aftertreatment at substantially all engine speeds and loads.

22. The method of claim 1, wherein said useful work is produced at greater than 30% thermal efficiency at substantially all normal engine speeds and loads.

23. The method of claim 1, further comprising providing sufficient intake system pressure to assure sufficient oxygen for combustion of said fuel.

24. The method of claim 1, further comprising compressing the air or recirculated exhaust gas before intake into the combustion chamber such that the ratio between the mass of the mixture of air and recirculated exhaust gas and the mass of the injected fuel is between 25:1 and 45:1 for operation of the engine at medium or high loads.

25. The method of claim 1, further comprising: taking into the combustion chamber a quantity of the mixture of air and recirculated exhaust gas that is greater than that needed for stoichiometry with the fuel injected into the combustion chamber, thereby providing sufficient excess oxygen in the combustion chamber to facilitate substantial completeness of combustion and to create exhaust products with sufficient oxygen for regeneration of a particulate trap.

26. The method of claim 25, further comprising: continuously providing the combustion chamber with a predetermined amount of excess oxygen to maintain exhaust oxygen levels sufficient for continuous particulate trap regeneration at a balance point during operation of the engine.

27. A method of operating an internal combustion diesel engine comprising:
   taking into a combustion chamber of an internal combustion diesel engine a mixture of air and recirculated exhaust gas, wherein the oxygen concentration of said mixture of air and recirculated exhaust gas is between 11% and 14%;
   injecting fuel into said combustion chamber at a fuel injection pressure exceeding 2000 bar; and
   combusting said fuel in said combustion chamber with said mixture of air and recirculated exhaust gas, thereby producing useful work and a new quantity of exhaust gas, said new quantity of gas including a level of nitrogen oxides (NOx) equal to or less than 0.2 grams per horsepower-hour of work performed by the engine and a smoke content at or below a Bosch Smoke Number of 3.

28. An internal combustion engine system comprising:
   one or more cylinders, each cylinder providing a combustion chamber;
   one or more fuel injectors in communication with said cylinder(s), capable of injecting fuel into each said combustion chamber at fuel injection pressures exceeding 1800 bar;
   an air intake line operatively connected to the cylinder(s), to provide air to the combustion chamber(s);
   an exhaust line also operatively connected to the cylinder(s), to receive exhaust gas from the combustion chamber(s), and including means for recirculation of a portion of said exhaust gas to said air intake line;
   means for combining recirculated exhaust gas with ambient air in said air intake line;
   an EGR control valve operated so as to control the oxygen concentration of the combined recirculated exhaust gas and ambient air to a value below 16%;
   one or more compressors operatively connected to the air intake line, to pressurize said recirculated exhaust gas and/or ambient air before their entry into said combustion chamber(s); and
   a controller programmed to control the quantity of fuel injected in relation to the extent of pressurization of said recirculated exhaust gas or ambient air taken into the combustion chamber so as to maintain the level of nitrogen oxides (NOx) in the exhaust gas equal to or below 1.0 gram per horsepower-hour.

29. The internal combustion engine system of claim 28, wherein the EGR control valve is operated so as to control the oxygen concentration of the combined recirculated exhaust gas and ambient air to a value below 15%.

30. The internal combustion engine system of claim 28, wherein the EGR control valve is operated so as to control the oxygen concentration of the combined recirculated exhaust gas and ambient air to a value below 14%.

31. The internal combustion engine system of claim 28, wherein the EGR control valve is operated so as to control the oxygen concentration of the combined recirculated exhaust gas and ambient air to a value between 12% and 13.5%.

32. The internal combustion engine system of claim 28, wherein the EGR control valve is operated so as to control the oxygen concentration of the combined recirculated exhaust gas and ambient air to a predetermined relatively constant value.

33. The internal combustion engine system of claim 28, wherein said fuel injectors are capable of injecting fuel into said combustion chamber(s) at a fuel injection pressure that meets or exceeds 2000 bar independently of engine speed or load.

34. The internal combustion engine system of claim 28, wherein said fuel injectors are capable of injecting fuel into said combustion chamber(s) at a fuel injection pressure that meets or exceeds 2100 bar independently of engine speed or load.

35. The internal combustion engine system of claim 28, wherein said fuel injectors are capable of injecting fuel into said combustion chamber(s) at a fuel injection pressure that meets or exceeds 2300 bar independently of engine speed or load.

36. The internal combustion engine system of claim 28, wherein said fuel injectors are capable of injecting fuel into said combustion chamber(s) at a fuel injection pressure that meets or exceeds 2500 bar independently of engine speed or load.

37. The internal combustion engine system of claim 28, wherein said fuel injectors are capable of injecting fuel into said combustion chamber(s) at a fuel injection pressure that meets or exceeds 3000 bar.

38. The internal combustion engine system of claim 28, wherein the level of nitrogen oxides (NOx) in the exhaust gas is maintained equal to or below 0.5 grams per horsepower-hour of work performed by the engine at substantially all engine speeds and loads.

39. The internal combustion engine system of claim 28, wherein the level of nitrogen oxides (NOx) in the exhaust gas is maintained equal to or below 0.2 grams per horsepower-hour of work performed by the engine at substantially all engine speeds and loads.

40. The internal combustion engine system of claim 28, with a smoke content level in the exhaust gas maintained at or below a Bosch Smoke Number of 3 before or without aftertreatment.

41. The internal combustion engine system of claim 28, with a smoke content level in the exhaust gas maintained at or below an average Bosch Smoke Number of 1.5 before or without aftertreatment.

42. The internal combustion engine system of claim 39, with a smoke content level in the exhaust gas also maintained at or below a Bosch Smoke Number of 3 before or without aftertreatment at substantially all engine speeds and loads.

43. The internal combustion engine system of claim 28, wherein useful work is produced at greater than 30% thermal efficiency at substantially all normal engine speeds and loads.

44. The internal combustion engine system of claim 28, wherein the controller is programmed to ensure that the combustion chamber receives a sufficient amount of excess oxygen for particulate trap regeneration.

45. The internal combustion engine system of claim 44, wherein the combustion chamber is provided with a predetermined amount of excess oxygen to maintain exhaust oxygen levels sufficient for continuous particulate trap regeneration at a balance point during operation of the engine.

46. The internal combustion engine system of claim 28, wherein the ratio between the mass of the mixture of air and recirculated exhaust gas in the combustion chamber and the mass of the injected fuel is between 25:1 and 45:1 for operation of the engine at medium or high loads.

47. The internal combustion engine system of claim 28, wherein the amount of the mixture of air and recirculated exhaust gas taken into the combustion chamber is greater than that needed for stoichiometry with the fuel injected into the combustion chamber, thereby providing sufficient excess oxygen to facilitate substantial completeness of combustion and to create exhaust products with an oxygen concentration sufficient for regeneration of a particulate trap.

48. The internal combustion engine system of claim 28, further comprising a low pressure EGR loop for recirculation of the exhaust gas.

49. An internal combustion engine system comprising:
one or more cylinders, each cylinder providing a combustion chamber;
one or more fuel injectors in communication with said cylinder(s), capable of injecting fuel into each said combustion chamber at fuel injection pressures exceeding 2000 bar;
an air intake line operatively connected to the cylinder(s), to provide air to the combustion chamber(s);
an exhaust line also operatively connected to the cylinder(s), to receive exhaust gas from the combustion chamber(s), and including means for recirculation of a portion of said exhaust gas to said air intake line;
means for combining recirculated exhaust gas with ambient air in said air intake line;
an EGR control valve operated so as to control the oxygen concentration of the combined recirculated exhaust gas and ambient air to a value between 11% and 14%;
one or more compressors operatively connected to the air intake line, to pressurize said recirculated exhaust gas and/or ambient air before their entry into said combustion chamber(s); and
a controller programmed to control the quantity of fuel injected in relation to the extent of pressurization of said recirculated exhaust gas or ambient air taken into the combustion chamber so as to maintain the level of nitrogen oxides (NOx) in the exhaust gas equal to or below 0.2 grams per horsepower-hour.

50. The internal combustion engine system of claim 49, with a smoke content level in the exhaust gas maintained at or below a Bosch Smoke Number of 3 before or without aftertreatment.

51. A method of reducing formation of nitrogen oxides (NOx) in an internal combustion diesel engine, comprising controlling the oxygen concentration of air used in combustion in the diesel engine to stay between 10% and 15% for medium and high loads.

52. The method of claim 51, further comprising controlling the oxygen concentration of air used in combustion to stay between 11% and 14% for medium and high loads.

53. The method of claim 51, further comprising controlling the oxygen concentration of air used in combustion to stay between 12% and 13.5% for medium and high loads.

54. The method of claim 51, wherein the oxygen concentration of air used in combustion is controlled to a predetermined relatively constant value in part through maintaining the oxygen concentration of recirculated exhaust gas to a predetermined relatively constant value.

55. The method of claim 51, further comprising maintaining nitrogen oxides (NOx) in the exhaust of said engine equal or below 0.2 grams per horsepower-hour of work performed by said engine.

* * * * *

UNITED STATES PATENT AND TRADEMARK OFFICE
CERTIFICATE OF CORRECTION

PATENT NO. : 6,857,263 B2 Page 1 of 1
DATED : February 22, 2005
INVENTOR(S) : Charles L. Gray, Jr. and James Haugen It is certified that error appears in the above-identified patent and that said Letters Patent is hereby corrected as shown below:

<u>Title page,</u>
Item [75], Inventors, please add -- Karl H. Hellman, Ann Arbor, MI (US) --.

Signed and Sealed this

Tenth Day of May, 2005

JON W. DUDAS
*Director of the United States Patent and Trademark Office*